United States Patent [19]

Martin

[11] Patent Number: 5,143,327
[45] Date of Patent: Sep. 1, 1992

[54] INTEGRATED LAUNCH AND EMERGENCY VEHICLE SYSTEM

[75] Inventor: James A. Martin, Gloucester, Va.

[73] Assignee: The United States of America as represented by the Administrator of the National Aeronautics and Space Administration, Washington, D.C.

[21] Appl. No.: 575,737

[22] Filed: Aug. 31, 1990

[51] Int. Cl.[5] .............................................. B64G 1/40
[52] U.S. Cl. ................................ 244/158 R; 244/160; 244/172
[58] Field of Search ............... 244/158 R, 2, 172, 160, 244/161, 162

[56] References Cited

U.S. PATENT DOCUMENTS

| | | | |
|---|---|---|---|
| 3,369,771 | 2/1968 | Walley et al. | 244/162 |
| 3,929,306 | 12/1975 | Faget et al. | 244/162 |
| 4,884,770 | 12/1989 | Martin | 244/160 |

*Primary Examiner*—Joseph F. Peters, Jr.
*Assistant Examiner*—Carla Mattix
*Attorney, Agent, or Firm*—Kevin B. Osborne

[57] ABSTRACT

A heavy launch vehicle for placing a payload into a spatial Earth orbit including an expendable, multi-container, propellant tank having a plurality of winged booster propulsion modules releasably disposed about one end thereof; and a payload supported by adapter structure at the other end. The preferred payload is an entry module adapted to be docked to a space station and used as a return vehicle for the space station crew, as scheduled, or in emergency situations. Alternately, the payload may include communication satellites, supplies, equipment and/or structural elements for the space station. The winged propulsion modules are released from the expendable propellant tank in pairs and return to Earth in a controlled glide, for safe landing at or near the launch site and prepared for reuse. The rocket engines for each propulsion module are dual-fuel, dual-mode engines and use methane-oxygen and hydrogen-oxygen, respectively, from the multi-containers of the propellant tank. When the propulsion modules are released from the expendable propellant tank, the rocket engines are pivotally moved into the module cargo bay for the return glide flight.

11 Claims, 4 Drawing Sheets

INTEGRATED LAUNCH AND EMERGENCY VEHICLE SYSTEM

ORIGIN OF THE INVENTION

The invention described herein was made by an employee of the United States Government and may be manufactured and used by or for the Government for governmental purposes without the payment of any royalties thereon or therefor.

FIELD OF THE INVENTION

This invention relates generally to space transportation systems and relates specifically to a heavy launch vehicle system that employs multiple winged booster elements, an expendable propellant tank, and an avionics module payload that can serve as an emergency escape vehicle for a space station crew to return to Earth.

BACKGROUND OF THE INVENTION

In the continuing exploration of space there remains the need to minimize the costs of launch systems, orbital vehicles and the development of manned extraterrestrial space stations. Also, since all the hazards of long duration space flight still remain relatively unknown, the need for an emergency entry vehicle on board any manned space station is believed to be a necessity.

SUMMARY OF THE INVENTION

Accordingly, it is an object of the present invention to provide a heavy launch vehicle system for placing a payload in spatial orbit that employs a minimum of expendable parts.

Another object of the present invention is to provide recoverable winged propulsion modules for a launch vehicle.

An additional object of the present invention is to provide an entry vehicle that may be used by space station occupants for emergency situations requiring the return of some or all of the space station crew.

According to the present invention, the foregoing and additional objects are obtained by providing a heavy launch vehicle propelled by multiple winged booster modules releasably disposed around one end of a common expendable propellant tank, with an orbital payload disposed on the other end of the expendable tank. The payload may be in the form of an orbital vehicle, communications satellite, supplies or structural components for a space station, or a combination thereof. In the preferred embodiment the payload is in the form of an entry vehicle having on-orbit maneuvering and de-orbit propulsion mechanism, entry and landing aerodynamic control surfaces, and avionics for returning and landing autonomously or with a remote pilot. The entry vehicle is provided with a payload bay of adequate size to seat the entire crew of presently planned space stations and may be manned or unmanned when place in orbit.

DETAILED DESCRIPTION

A more complete appreciation of the invention and many of the attendant advantages thereof will be readily apparent as the same becomes better understood by reference to the following detailed description when considered in connection with the accompanying drawings wherein.

Figure 1:
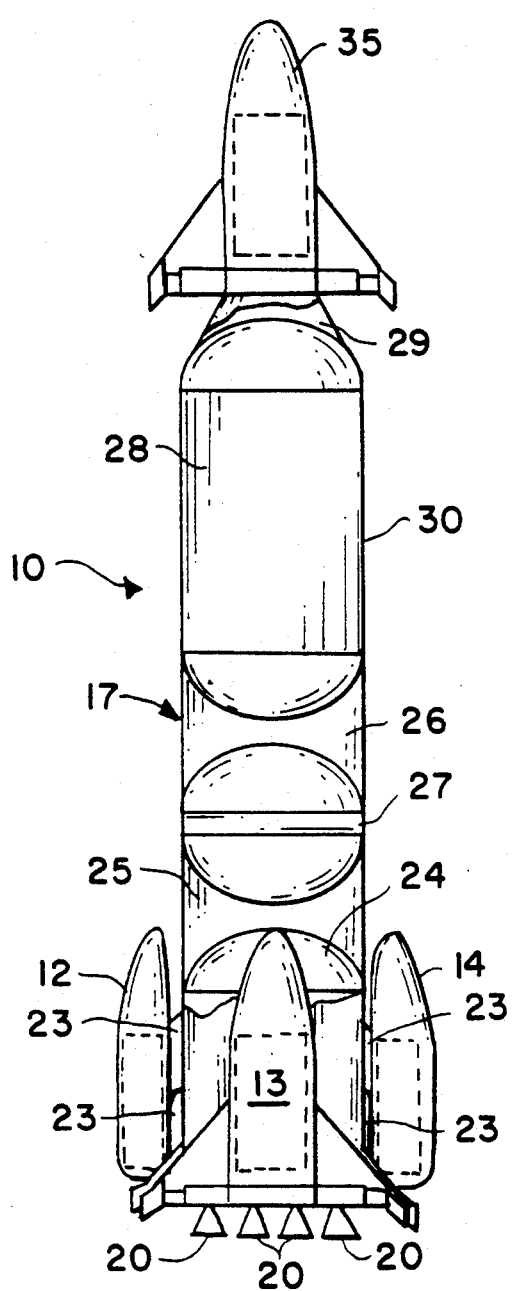
FIG. 1 is a part schematic view of the heavy lift launch vehicle system of the present invention with parts broken away; and illustrating the preferred embodiment entry vehicle payload.
Figure 2:
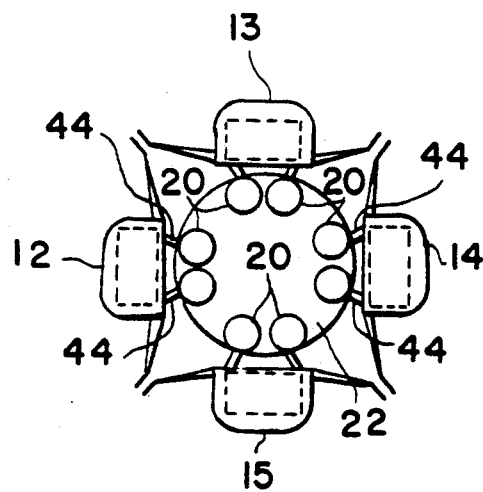
FIG. 2 is a rear view of the heavy lift launch system shown in FIG. 1.

Referring now to the drawings, and more particularly to FIGS. 1 and 2, the heavy lift launch vehicle of the present invention is shown and designated generally by reference numeral 10. Launch vehicle 10 includes four identical propulsion modules 12, 13, 14, 15 releasably attached to an expendable outside propellant tank 17. Each of propulsion modules 12, 13, 14, 15 is provided with a pair of identical rocket engines 20, as will be further described hereinafter. Expendable tank 17 contains all of the ascent propellants needed for a mission by vehicle 10. Propellant lines 21 (FIG. 4) extend through the base of expendable tank 17 and thrust connecting structure 22 to each of the engines 20 of propulsion modules 12, 13, 14, 15. As illustrated, engines 20 are all located at the base of tank 17 abutting the thrust connection structure 22, as will be further described hereinafter. Engines 20 are all dual-fuel, dual-mode systems that burn methane-oxygen early in the flight and switch to hydrogen-oxygen later. Each propulsion module 12, 13, 14, 15 is releasably attached to the periphery of expendable tank 17 via suitable bracket connections 23, and is provided with the necessary entry and aerodynamic surfaces, avionics, and landing gear for a glide flight return and safe landing on Earth.

Expendable tank 17 includes a multi-compartment outer shell 30 housing a lower tank 24, an intermediate or middle tank 27, and an upper tank 28. Tank adapters 25 and 26 are disposed, respectively, between lower tank 24 and intermediate tank 27 and between intermediate tank 27 and upper tank 28. A nose adapter 29 abuts the top surface of upper tank 28. Lower tank 24 is designed to carry oxygen, intermediate tank 27 is designed to carry methane propellant for the early part of the system flight and upper tank 28 is designed to carry hydrogen propellant fuel for engines 20 during the latter phases of flight. Oxygen from lower tank 24 is admixed with both the methane and hydrogen propellants, as used, in a conventional manner and not further described herein in the interest of brevity.

An entry module 35 serves as the payload for launch vehicle and is attached to nose adapter 29.

Figure 3:
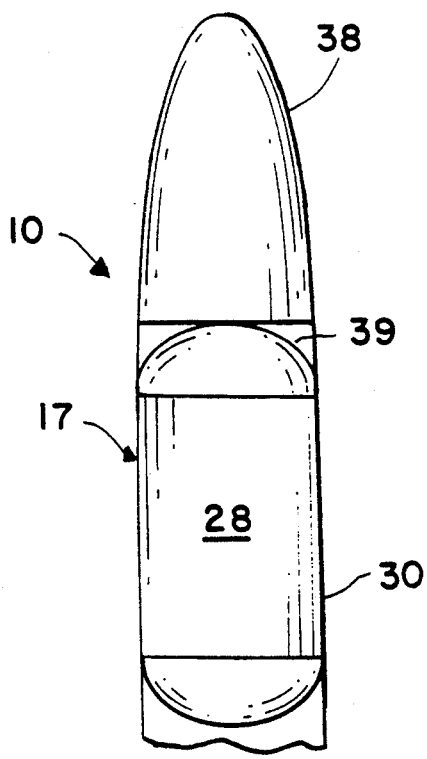
FIG. 3 is a partial view of the heavy lift launch system shown in FIG. 1 and illustrating an alternate embodiment payload.

Referring now to FIG. 3, an alternate payload for launch vehicle 10 is illustrated. In this embodiment a nose cone 38 is attached to expendable tank 17 via tank adapter 39 disposed on top of upper tank 28. Nose cone payload 38 is adaptable to carry communication satellites, with or without additional booster engines for achieving higher orbits, supplies and/or structural components for an orbiting space station, or other space payloads.

Figure 4:
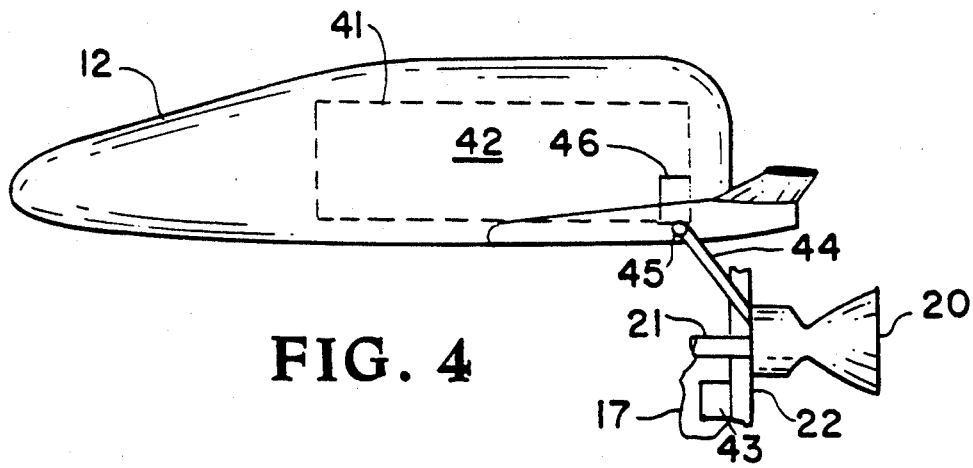
FIG. 4 is a somewhat schematic side view of one of the propulsion modules employed in the heavy lift launch system shown in FIGS. 1-3.

Referring now more particularly to FIG. 4, one propulsion module 12 is shown with one of the two propulsions engines therefor being visible and illustrated in thrust operative position, as in FIG. 1. The dotted line 41 in FIGS. 4 and 5 outlines the available cargo space 42 within module 12. As shown therein, each of the engines 20 is releasably attached to thrust connecting structure 22 at the base of expendable tank 17. Propellant lines 21 lead from expendable tank 17 through thrust connecting structure 22 into each of the engines 20. Once thrust module 12 has completed its mission, conventional umbilical type separation apparatus, designated by reference numeral 43, is actuated to sever the connection of propellant lines 21, thrust structure 22 and brackets 23 to effect release of module 12 from expendable tank 17. The separation apparatus may be any conventional separation mechanism and operable by electrical, pneumatic, hydraulic or explosive means.

Figure 5:
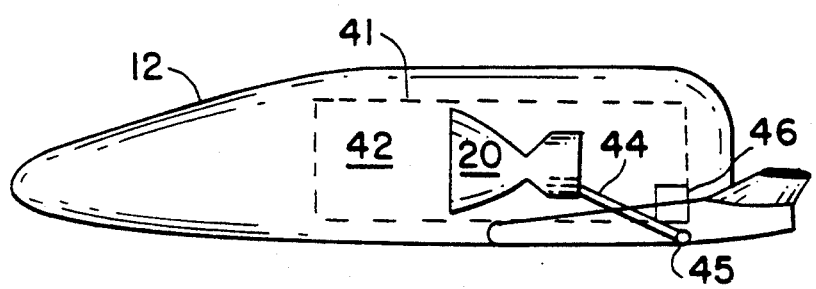
FIG. 5 is a view of the propulsion module shown in FIG. 4 with the propulsion engines retracted within the module for return flight after a mission.

Once module 12 is separated from expendable tank 17, it is prepared for a glide flight back to, or adjacent to, the launch site. As illustrated in FIGS. 4 and 5, engines 20 are attached to a support structure 44 pivotally connected at pivot point 45 in the base aft end of module 12. Suitable bay doors, either a single or double sliding door, or clam shell type doors (not illustrated), are opened in the base of module to provide a path that permits swinging of engines 20 about pivot point 45, under the influence of a suitable motor 46, and permit positioning of engines 20 within payload bay 42, as illustrated in FIG. 5. The module bay doors are then closed with engines 20 being placed in a position near the center of module 12 for the return flight to Earth. This center positioning of the engines avoids any problem that might arise from an aft center of gravity.

Figure 6:
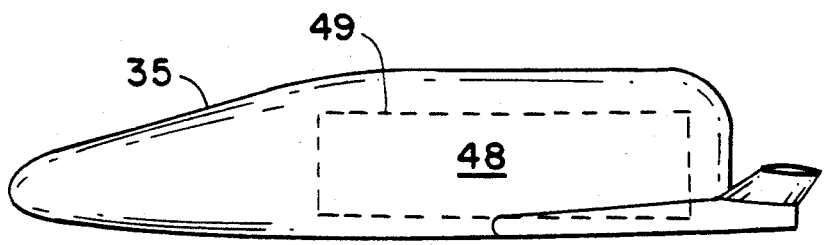
FIG. 6 is a schematic side plan view of the entry vehicle payload according to the present invention and as shown in FIG. 1.
Figure 7:
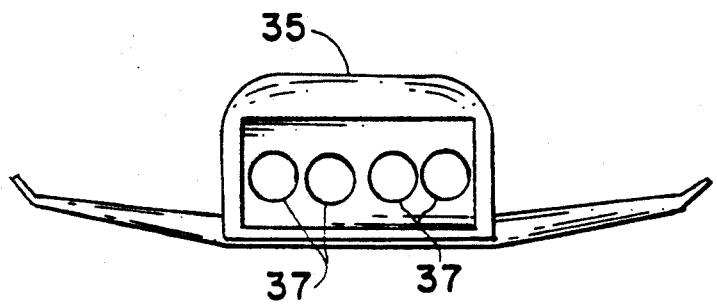
FIG. 7 is a schematic rear view of the entry vehicle shown in FIG. 6.

Referring now more particularly to FIGS. 6 and 7, side and rear views, respectively, of the preferred payload entry module 35 are shown. As apparent, entry module 35 has essentially the identical configuration as propulsion modules 12, 13, 14, 15 and is provided with a payload bay 48, as outlined by dotted line 49 (FIG. 6). Entry module 35 is provided with on-orbit maneuvering and de-orbit propulsion engines 37, entry and landing aerodynamic control surfaces and the required avionics for returning and landing autonomously or with a remote pilot. These features are conventional with the present day Space Shuttle and are not further described herein in the interest of brevity. Payload bay 48 contains adequate seats for the entire crew of presently proposed space stations. Entry module 35 is designed to be docked at a space station and serve as an emergency entry module if needed due to accidents or illness involving the space station crew members. When launched, entry module 35 may be manned or unmanned and could transport passengers with the required accommodations or be used to transport supplies or structural components from Earth to an orbiting space station. Also, entry module 35 may be used to transport other payloads into space, as well as to return payloads from space.

Figure 8:
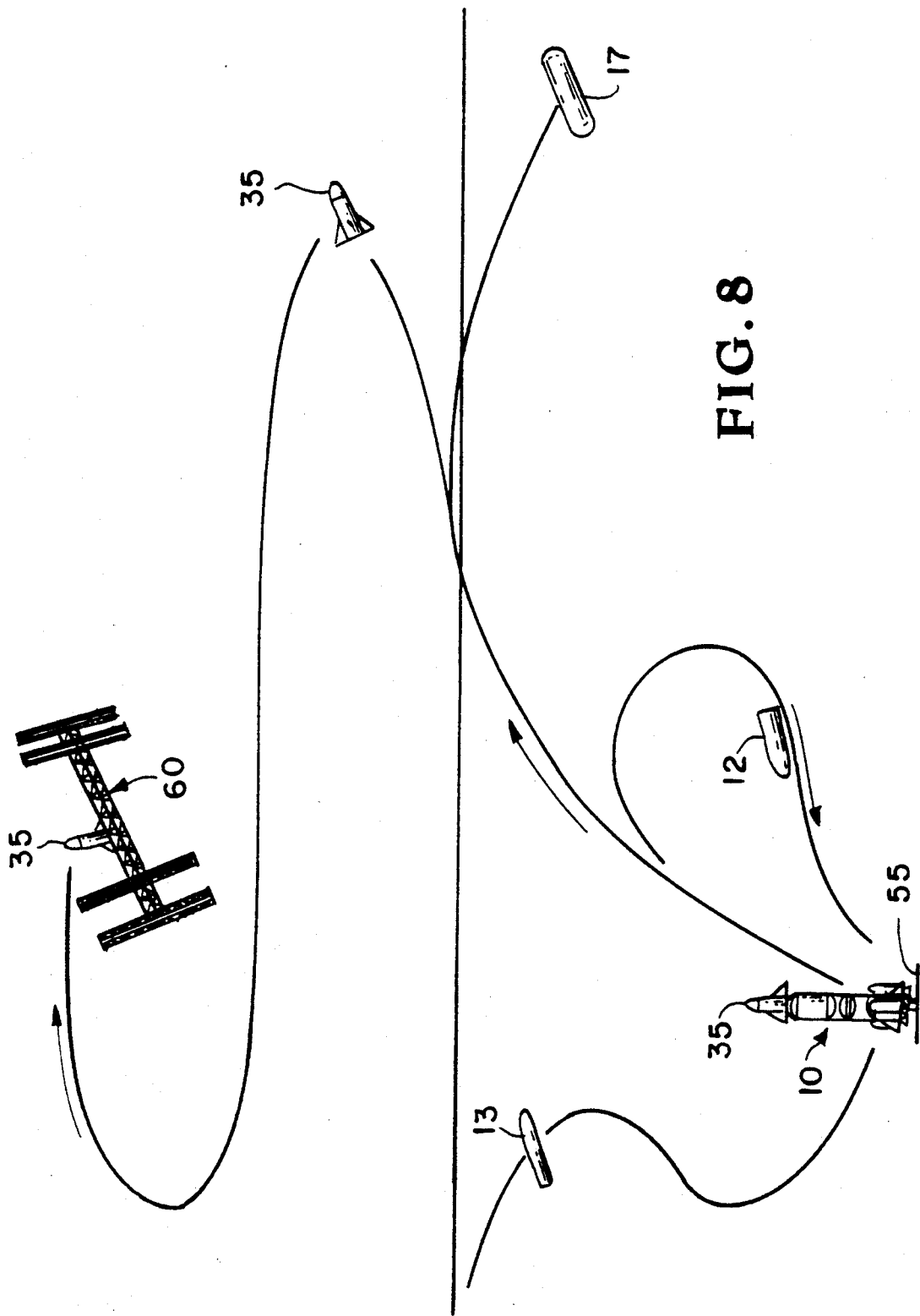
FIG. 8 is a graphic illustration of the flight paths for launching and return of the various vehicle components shown in FIG. 1.

Referring now more particularly to FIG. 8, a graphical illustration of the flight paths for launching and returning of some of the components is shown. As shown therein, vehicle 10 is launched from an Earth site 55 and propelled by the four propulsion modules 12, 13, 14, 15 as described hereinbefore. When launch vehicle 10 reaches a speed of approximately Mach 3, a pair of oppositely disposed propulsion modules, e.g. modules 12, 14, are separated from vehicle 10 and returned on a glide path back to the launch site for reuse at a later time.

During the high altitude coast before modules 12 and 14 start their glide return flight, the dynamic pressure is low and engines 20 may be easily pivotally moved for stowage within the modules, as described hereinbefore. The remaining two propulsion modules 13, 15 continue to propel vehicle 10 into a spatial orbit. The modules are then separated and return after at least one orbit about the Earth. Only one module of each pair is shown in this FIG. in the interest of brevity, it being understood that modules 12 and 14 are separated at the same time (at approximately Mach 3 in the described embodiment) and module pair 13 and 15 separate from expendable tank 17 at the same time and after achieving orbit. The external expendable tank 17 also goes into orbit and is disposed of by entry into a safe area or may be used in orbit, for whatever purpose needed, as so desired. Payload entry module 35 is delivered to, and docks with, an orbiting space station 60 to deliver man, supplies or equipment and to be available for emergency or scheduled return to Earth.

Entry module 35, as well as each of propulsion modules 12, 13, 14, 15, are provided with conventional retractable landing gear for landing at the launch or other designated area upon return to Earth.

Figure 9:
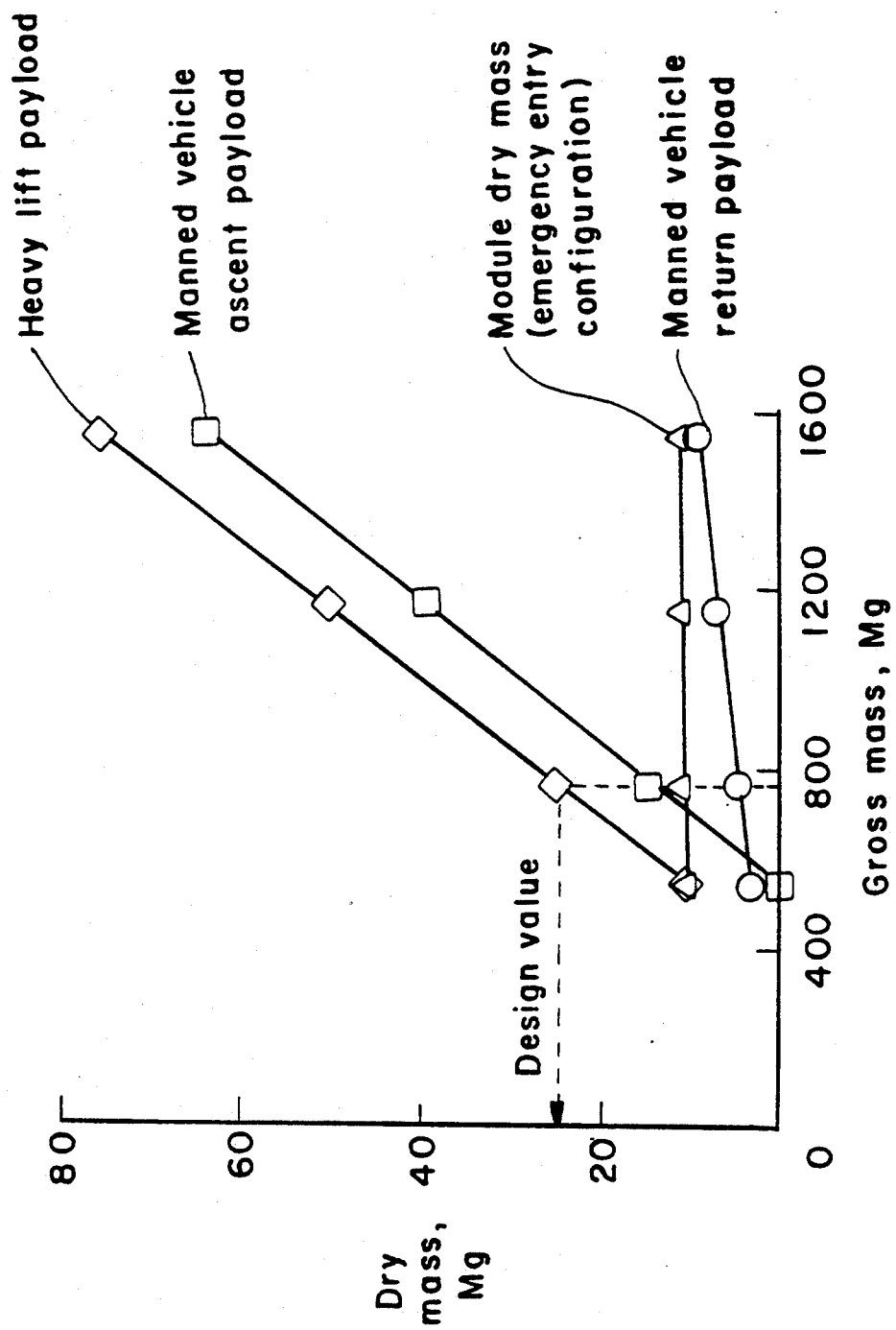
FIG. 9 is a graphic illustration of calculated mass estimates for the various subsystems and illustrating the design values chosen.

Referring now to FIG. 9, the graphic illustration of calculated mass estimates for the various subsystems and the design parameters chosen for the present invention is shown. An optimized trajectory was used to estimate the propellant consumption and mass estimates calculated for the various subsystems as shown in Table I.

TABLE I

| Mass Statement in Millions of Grams (Mg) | |
|---|---|
| Module dry mass (emergency entry configuration) | 11 Mg |
| Fluids (maximum) | 2 |
| Return payload or propulsion | 4 |
| Module gross mass | 17 |
| Heavy-lift payload | 25 |
| Total, four propulsion modules | 68 |
| Expendable tank | 22 |
| Propellant, including reserves and losses | 647 |
| Gross mass | 762 |

For these calculations, the return payload of the manned vehicle entry vehicle 35 was assumed to be equal to the mass of the engines in propulsion modules 12, 13, 14, 15, i.e. four Mg, and entry module 35 was accordingly sized to return the engine masses. The resulting module dry mass does not change rapidly with gross while the heavy-lift payload mass changes rapidly (FIG. 9). As shown, at the lowest gross mass shown, the manned vehicle ascent payload 35 is less than the manned vehicle return payload and is thus not a reasonable size to select for vehicle 35. The smallest reasonable selection appears to be where the advanced manned vehicle payload is the same for ascent and return, or near 600 Mg gross mass. At high values of gross mass, the advanced manned vehicle ascent payload exceeds the return payload by large amounts. Since the operating costs of the launch vehicle system 10 are largely determined by the expendable tank 17, which is proportional to the gross mass, a selection of a very large mass is deemed economically unacceptable.

The data point with a heavy lift payload of 25 Mg appeared to be a reasonable compromise and was selected for the design value of payload entry vehicle 35 (FIGS. 1 and 2) and nose cone payload 38 (FIG. 3).

The payload bay volume of entry vehicle 35 is sufficient to provide the same payload density as the Space Shuttle (98 Kg/m).

The masses of the system elements employed in the present invention are those given in Table I. As shown therein, the selected heavy lift payload of 25 Mg results in a gross mass system of 762 Mg. The advanced manned entry vehicle 35 is designed to carry a return payload of 4 Mg. The module dry mass of 11 Mg is an indication of the costs of the described system which is substantially less than the presently used internal propellant booster system for launching the Space Shuttle.

The present invention can satisfy the need for a heavy-lift launch vehicle, an advanced manned space vehicle and a space station emergency entry vehicle. The comparatively low development costs, reasonable operation costs due to the use of a relatively small expendable fuel tank, and the capabilities of retrieving and reusing the expensive propulsion modules, makes this invention an important tool for future and continued space exploration and utilization.

Although the invention has been described relative to specific embodiments thereof, it is not so limited, and these specific embodiments are to be deemed as exemplary only. There will be numerous variations and modifications of the specific details described herein that will be readily apparent to those skilled in the art in the light of the above teachings.

It is therefore to be understood that, within the scope of the appended claims, the invention may be practiced other than as specifically described herein.

What is claimed as new and desired to be secured by Letters Patent of the United States is:

1. A heavy launch vehicle for placing a payload into a spatial orbit about the Earth comprising:
   an elongated expendable propellant tank;
   a plurality of propulsion modules releasably attached to and circumferentially disposed around the exterior surface of one end of said expendable tank;
   a payload releasably attached to the end of said expendable tank opposite to said propulsion modules;
   said elongated expendable propellant tank having multiple internal, individual, propellant tanks disposed in tandem relationship therein;
   each of said plurality of propulsion modules including a pair of rocket engines;
   thrust connection structure disposed between said expendable tank and said engines and serving to releasably secure said engines in operative thrust position; and
   propellant lines extending from said expendable tank through said thrust connection structure to each of said rocket engines, said rocket engines being supplied with propellant exclusively from said expendable propellant tank.

2. The heavy launch vehicle of claim 1 wherein said multiple internal propellent tanks include:
   a first propellant tank disposed adjacent said plurality of propulsion modules;
   a first tank spacer element having one surface abutting said first propellant tank and another surface abutting a second propellent tank;
   a second tank spacer element having a first surface abutting said second propellant tank;
   a third propellant tank having a first end abutting a second surface of said second tank spacer, and
   a third spacer element abutting a second end of said third propellant tank.

3. The heavy launch vehicle of claim 1 wherein said plurality of propulsion modules includes four winged modules, each said module having entry and landing aerodynamic control surfaces and avionics and landing gear necessary for a glide flight return and landing on Earth.

4. The heavy launch vehicle of claim 1 wherein said rocket engines are dual-fuel, dual-mode engines capable of operating on both methane-oxygen propellant and hydrogen-oxygen propellant and wherein said multiple internal propellant tanks in said expendable fuel tank includes one tank of oxygen, one tank of methane and one tank of hydrogen rocket propellent.

5. The heavy launch vehicle of claim 1 wherein said payload is a winged entry vehicle adapted to dock with an orbiting space station and having a cargo bay including accommodations for scheduled or emergency return of the space station crew to Earth.

6. The heavy launch vehicle of claim 1 further comprising on-orbit maneuvering and de-orbit propulsion engines, entry and landing aerodynamic control surfaces and avionics and landing gear for returning and landing autonomously or with a remote pilot.

7. The heavy launch vehicle of claim 1 wherein each said pair of rocket engines for each module are provided with a pivot connection securing the engines to a module; said engines being movable about said pivot connection upon completion of a thrust flight and upon said propulsion module being separated from said expendable tank to position said engines within the propulsion module for a return glide back to Earth.

8. The heavy launch vehicle of claim 1 wherein said plurality of propulsion modules includes four winged modules, said four winged modules being separable from said expendable tank during the flight of said payload to spatial orbit and wherein a spaced pair of said winged modules disposed circumferentially around the exterior surface of said expendable tank are released from said expendable tank when said launch vehicle reaches a speed of approximately Mach 3 and the remaining pair of said winged modules continue with said expendable tank into orbit and are returned to Earch after traversing at least one orbit.

9. The heavy launch vehicle of claim 1 including means for separating said thrust connection structure and said propellant lines from said rocket engines.

10. The heavy launch vehicle of claim 8 including means for pivotally attaching said rocket engines to said propulsion modules and means for effecting pivotal movement of said engines into a cargo bay of said propulsion module for return flight back to Earth.

11. A method of placing a payload in a spatial orbit about the Earth comprising:
    providing an expendable, multi-compartment, elongated propulsion tank having a first compartment housing oxygen, a second compartment housing a methane propellant, and a third compartment housing a hydrogen propellant;

providing a plurality of winged propulsion modules releasably attached and circumferentially disposed about one end of the elongated propellent tank and a payload releasably attached to the other end thereof;

providing fuel to dual-fuel and dual-mode engines for the winged propulsion modules exclusively from the propulsion tank;

employing the engines on the winged propulsion modules to transport the payload on a flight initially using a methane-oxygen mixture propellant to blast off from Earth and switching to hydrogen-oxygen propellent when the supply of methane is exhausted;

separating at least some of the winged propulsion modules from the expendable tank when a flight speed of approximately Mach 3 is reached and recovering the separated modules after a controlled glide flight back to Earth;

separating the remaining winged propulsion modules from the expendable tank and separating the expendable tank from the payload after an orbital flight path is obtained;

controlling the remaining winged propulsion modules during at least one orbital pass around the Earth and inducing their reentry and controlled glide flight path for landing on Earth; and controlling the reentry destruction of the expendable tank at a safe area.

* * * * *